United States Patent
Smith

(10) Patent No.: US 10,834,801 B2
(45) Date of Patent: Nov. 10, 2020

(54) METHOD AND APPARATUS FOR A DISPLAY MODULE CONTROL SYSTEM

(71) Applicant: GE Aviation Systems Limited, Cheltenham (GB)

(72) Inventor: Mark Andrew Smith, Cheltenham (GB)

(73) Assignee: GE Aviation Systems Limited, Cheltenham (GB)

(*) Notice: Subject to any disclaimer, the term of this patent is extended or adjusted under 35 U.S.C. 154(b) by 0 days.

(21) Appl. No.: 16/388,210

(22) Filed: Apr. 18, 2019

(65) Prior Publication Data
US 2019/0327817 A1  Oct. 24, 2019

(30) Foreign Application Priority Data

Apr. 18, 2018 (GB) .................................. 1806290.1

(51) Int. Cl.
| | |
|---|---|
| *H05B 47/18* | (2020.01) |
| *B64D 43/00* | (2006.01) |
| *G09G 3/34* | (2006.01) |
| *H05B 47/11* | (2020.01) |

(52) U.S. Cl.
CPC ............ *H05B 47/18* (2020.01); *B64D 43/00* (2013.01); *G09G 3/3406* (2013.01); *H05B 47/11* (2020.01); *G09G 2360/144* (2013.01); *G09G 2380/12* (2013.01)

(58) Field of Classification Search
CPC ............ H05B 37/0254; H05B 37/0218; H05B 47/18; H05B 47/11; B64D 43/00; G09G 3/3406; G09G 2360/144; G09G 2380/12
See application file for complete search history.

(56) References Cited

U.S. PATENT DOCUMENTS

| | | |
|---|---|---|
| 6,144,359 A | 11/2000 | Grave |
| 7,327,283 B2 | 2/2008 | Bandy |
| 7,465,079 B1 | 12/2008 | Cull |
| 7,492,356 B1 | 2/2009 | Pruitt |
| 7,541,697 B2 | 6/2009 | Flickinger |
| 8,620,613 B2* | 12/2013 | Segawa ............... G07C 3/08 702/128 |
| 9,093,041 B2 | 7/2015 | Schmidt |
| 2004/0145558 A1 | 7/2004 | Cheng |
| 2010/0156755 A1* | 6/2010 | Chou ............... G09G 5/10 345/1.1 |
| 2013/0049608 A1 | 2/2013 | Tatavoosian |
| 2014/0085265 A1* | 3/2014 | Yin ............... G01J 1/4204 345/175 |

(Continued)

OTHER PUBLICATIONS

Christian Miner, EIC 2800 Search Report, dated Sep. 17, 2019, Scientific and Technical Information Center (Year: 2019).*
European Search Report for EP19169339, dated May 23, 2019.

*Primary Examiner* — Raymond R Chai
(74) *Attorney, Agent, or Firm* — McGarry Bair PC

(57) ABSTRACT

A method and apparatus for operating a display module includes a backlight illuminator, an ambient light sensor configured to generate an output signal, and a backlight controller module operably coupled with the backlight illuminator, the ambient light sensor, and configured to determine the operational status signal of the ambient light sensor based on the output signal and operate backlight illuminator in accordance with the operational status signal.

9 Claims, 5 Drawing Sheets

(56) References Cited

U.S. PATENT DOCUMENTS

2014/0198084 A1* 7/2014 Peana .................. G09G 3/3406
  345/207
2016/0338181 A1* 11/2016 Schuch ................ G02F 1/1336
2019/0258959 A1* 8/2019 Devaraju .............. G06F 11/079
2019/0313050 A1* 10/2019 Wang ....................... H04N 5/58

* cited by examiner

METHOD AND APPARATUS FOR A DISPLAY MODULE CONTROL SYSTEM

CROSS REFERENCE TO RELATED APPLICATION(S)

This application claims priority to and the benefit of British Patent Application No. 1806290.1 filed Apr. 18, 2018.

BACKGROUND

Contemporary aircraft can include electronic devices including displays for displaying graphical, textual, or decimal information to a user, pilot, or co-pilot. Such information can be provided or presented to a user to inform the user of the status of the aircraft or a system thereof.

BRIEF DESCRIPTION

In one aspect, the present disclosure relates to a display module, including a backlight illuminator, an ambient light sensor configured to generate an output signal, a network interface, and a backlight controller module operably coupled with the backlight illuminator, the ambient light sensor, and the network interface, and configured to communicate by way of the network interface and to determine an operational status signal of the ambient light sensor based on the output signal and operate backlight illuminator in accordance with the operational status signal, and, upon a determination that the operational status signal indicates the ambient light sensor has failed, operate the backlight illuminator in accordance with a replacement ambient light operational status signal receivable at the network interface.

Any permutation of aspects of the disclosure can also include wherein the backlight controller module is further configured to, upon the determination that the operational status of the ambient light sensor is failed, select the replacement ambient light operational status signal from a set of replacement ambient light operational status signals receivable at the network interface. Any permutation of aspects of the disclosure can also further include at least one of physical location data or orientation data, which is associated with the ambient light sensor and wherein the at least one of physical location data or orientation data is stored in memory of the backlight controller module. Any permutation of aspects of the disclosure can also include wherein the backlight controller module is further configured to select the replacement ambient light operational status signal from the set of replacement ambient light operational status signals based on at least one of physical location data or orientation data associated with the set of replacement ambient light operational status signals. Any permutation of aspects of the disclosure can also include wherein the backlight controller module is further configured to publish at least a subset of operational ambient light sensor data, physical location data, or orientation data, to the network interface.

In another aspect, the present disclosure relates to a display control system, including a network bus, a display module having a backlight illuminator, an ambient light sensor, and a backlight controller module, and a controller module remote from the display module and configured to receive an ambient light status signal from the network bus and to supply a replacement ambient light status signal. The backlight controller module is configured to determine an operational status of the ambient light sensor, and to supply an ambient light status signal representative of an operational status of the ambient light sensor to the network bus and wherein the backlight controller module is configured to illuminate the backlight illuminator in accordance with the ambient light sensor, and, upon a determination that the operational status of the ambient light sensor is failed, the backlight controller module is configured to receive the replacement ambient light status signal from the remote controller module and illuminate the backlight illuminator in accordance with the received replacement ambient light status signal.

Any permutation of aspects of the disclosure can also include wherein the ambient light status signal further includes at least a subset of: data sensed by the ambient light sensor, physical location data of the ambient light sensor, or orientation data of the ambient light sensor. Any permutation of aspects of the disclosure can also include wherein the replacement ambient light status signal includes is a set of replacement ambient light status signals and, wherein the backlight controller module is further configured to select the replacement ambient light status signal from the set of replacement ambient light status signals. Any permutation of aspects of the disclosure can also include wherein the remote controller module is configured to receive a signal from the display module indicative of the determination that the operational status of the ambient light sensor is failed, and to select the replacement ambient light status signal based on the most physically proximate ambient light sensor data, relative to the display module having the failed ambient light sensor, or the most similarly orientated ambient light sensor data, relative to the display module having the failed ambient light sensor.

In yet another aspect, the present disclosure relates to a method of operating a display module, the method including determining, in a backlight controller module, one of a failed status or an operating status of an ambient light sensor of the display module, upon determining the failed status, receiving a replacement ambient light operational status signal at a network interface operably coupled to the backlight controller module, and illuminating, via the backlight controller module, a backlight illuminator of the display module in accordance with the received replacement ambient light operational status signal.

Any permutation of aspects of the disclosure can also include, further upon determining the operating status, publishing, by the backlight controller module, the operating status of the ambient light sensor to a network by way of the network interface and illuminating the backlight illuminator in accordance with ambient light data generated by the ambient light sensor. Any permutation of aspects of the disclosure can also further include accumulating, in a controller module remote from the display module and communicatively coupled with the network interface, a set of operational statuses from a set of ambient light sensors, and publishing, by the controller module, at least one replacement ambient light operational status signal to the network interface. Any permutation of aspects of the disclosure can also include wherein the accumulating the set of operational statuses from the set of ambient light sensors includes at least a subset of operational statuses from a set of ambient light sensors of other display modules and at least a subset of operational statuses from a set of ambient light sensors without display modules. Any permutation of aspects of the disclosure can also include wherein publishing the at least one replacement ambient light operational status signal includes at least a portion of at least one of the accumulated set of operational statuses. Any permutation of aspects of the disclosure can also include wherein the accumulating the set of operational statuses includes accumulating at least one of physical location data or orientation data related to each of the set of ambient light sensors. Any permutation of aspects of the disclosure can also include wherein publishing the at least one replacement ambient light operational status signal includes at least one of comparing a physical location of the display module having the failed ambient light sensor with a physical location of another ambient light sensor, or comparing the orientation of the display module having the failed ambient light sensor with an orientation of another ambient light sensor. Any permutation of aspects of the disclosure can also include wherein publishing the at least one replacement ambient light operational status signal further comprises at least one of selecting for publishing the operational status of the most physically proximate another ambient light sensor, relative to the display module having the failed ambient light sensor, or selecting for publishing the operational status of the most similarly orientated another ambient light sensor, relative to the display module having the failed ambient light sensor. Any permutation of aspects of the disclosure can also include wherein publishing the at least one replacement ambient light operational status signal includes combining at least a subset of the accumulated set of operational statuses. Any permutation of aspects of the disclosure can also further include selecting, in the controller module the replacement ambient light status signal from a published set of replacement ambient light operational status signals. Any permutation of aspects of the disclosure can also further include at least one of selecting the replacement ambient light operational status signal corresponding to the most physically proximate ambient light sensor, relative to the display module having the failed ambient light sensor, or selecting the replacement ambient light operational status signal corresponding to the most similarly orientated ambient light sensor, relative to the display module having the failed ambient light sensor.

DETAILED DESCRIPTION

Figure 1:
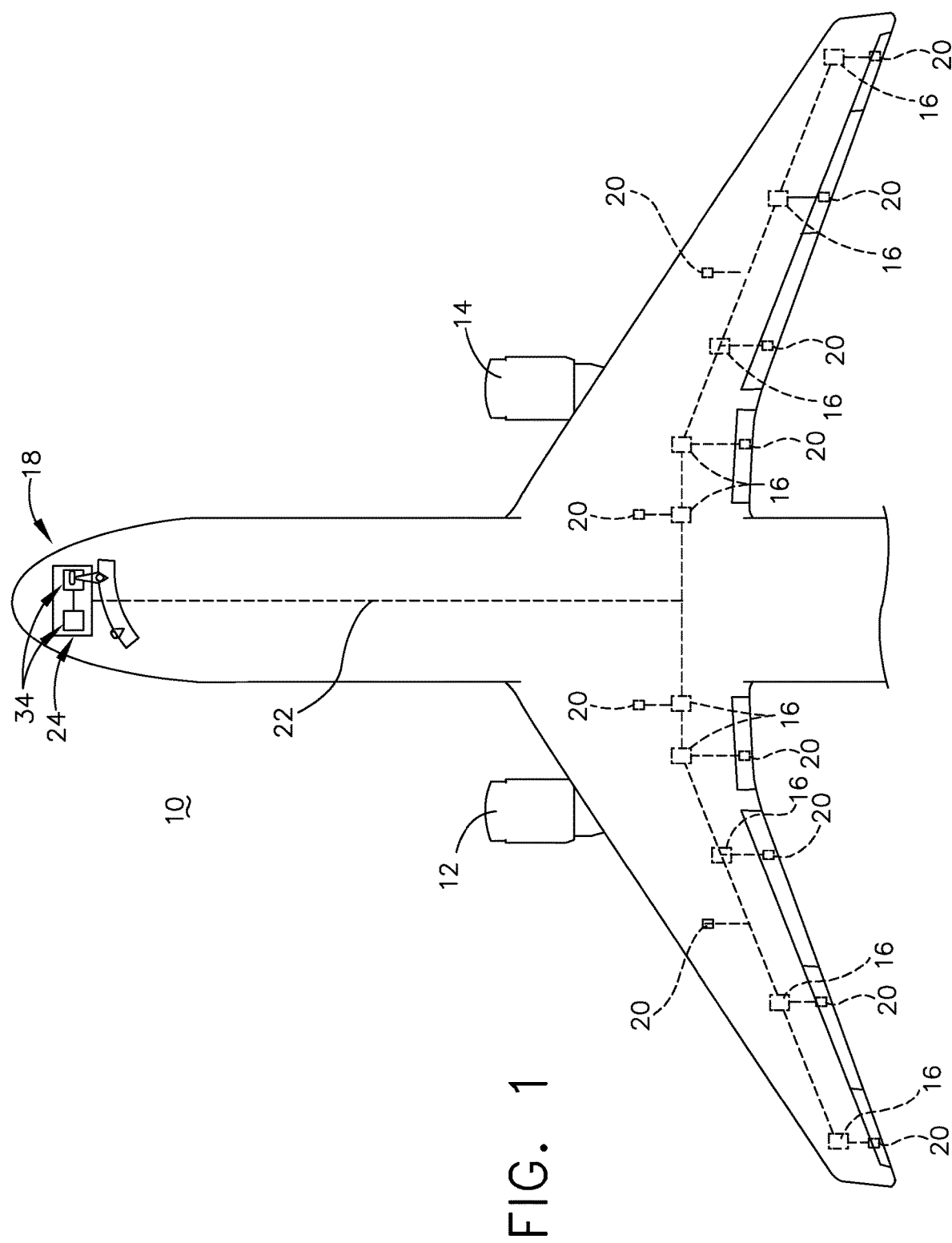
FIG. 1 is a top down schematic view of an aircraft in accordance with various aspects described herein.

The described aspects of the present disclosure are directed to a method and apparatus of operating a display control system for a display module assemblies. For purposes of illustration, the present disclosure will be described with respect to an aircraft cockpit display module assembly. It will be understood that the disclosure is not so limited and that the display module assembly and method of operating the display module assembly can be used anywhere within the aircraft, such as other mobile applications and non-mobile industrial, commercial, and residential applications, as desired.

While "a set of" various elements will be described, it will be understood that "a set" can include any number of the respective elements, including only one element. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

As used herein, a "network" can include a set of components, processing systems, sensors, display module assemblies, or the like, interconnected to enable, provide for, or otherwise allow for communication transmitted between the respective components. The "network" can include communication lines, wires, cables, conductors, or the like, and can be connected directly with other components or connected by way of a communications hub, such as a network switch. Communications can include analog or digital signal transmission on a deterministic network adaptation or protocol, and are not germane to the disclosure. Also as used herein, a "remote" component is a component communicatively connected by way of the network relative to a referentially described component. Thus, a "remote" component is a component communicatively or physically spaced from the reference component; they are not components on a same assembly.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

The exemplary drawings are for purposes of illustration only and the dimensions, positions, order, and relative sizes reflected in the drawings attached hereto can vary.

As illustrated in FIG. 1, an aircraft 10 is shown having at least one gas turbine engine, shown as a left engine system 12 and a right engine system 14. The left and right engine systems 12, 14 can be substantially identical. The aircraft is shown further having a set of communicative components, which are schematically represented by boxes. In one non-limiting example, the communicative components can include a set of aircraft or avionics systems 16 or subsystems 20. Non-limiting examples of avionics systems 16 or subsystems 20 can include line-replaceable units, sensors, or the like, and can be distributed about the aircraft 10. At least a subset of the avionics systems 16 or subsystems 20 can be communicatively interconnected with at least another subset of avionics systems 16 or subsystems 20 by way of a communications network 22, shown in dotted line. The aircraft 10 can also include a cockpit 18, shown proximate to the front or "nose" of the aircraft 10. In one non-limiting instance, the cockpit 18 can include a set of display module assemblies 24, also communicatively connected with the communications network 22. In the illustrated example, the set of display module assemblies 24 can include integrated multifunction flight displays with a display screen 34.

It will be understood that the illustrated aspect of the disclosure of FIG. 1 is only one non-limiting schematic example of an aircraft 10, and many other possible aspects and configurations in addition to that shown are contemplated by the present disclosure. Furthermore, the number of, and placement of, the various components depicted in FIG. 1 are also non-limiting examples of aspects associated with the disclosure. For example, while various components have been illustrated with relative position of the aircraft (e.g. avionics systems 16 and subsystems 20 distributed throughout the aircraft 10, or the set of display module assemblies 24 only proximate to the cockpit 18, etc.), aspects of the disclosure are not so limited, and the components are not so limited based on their schematic depictions. Additional aircraft 10 configurations are envisioned.

Figure 2:
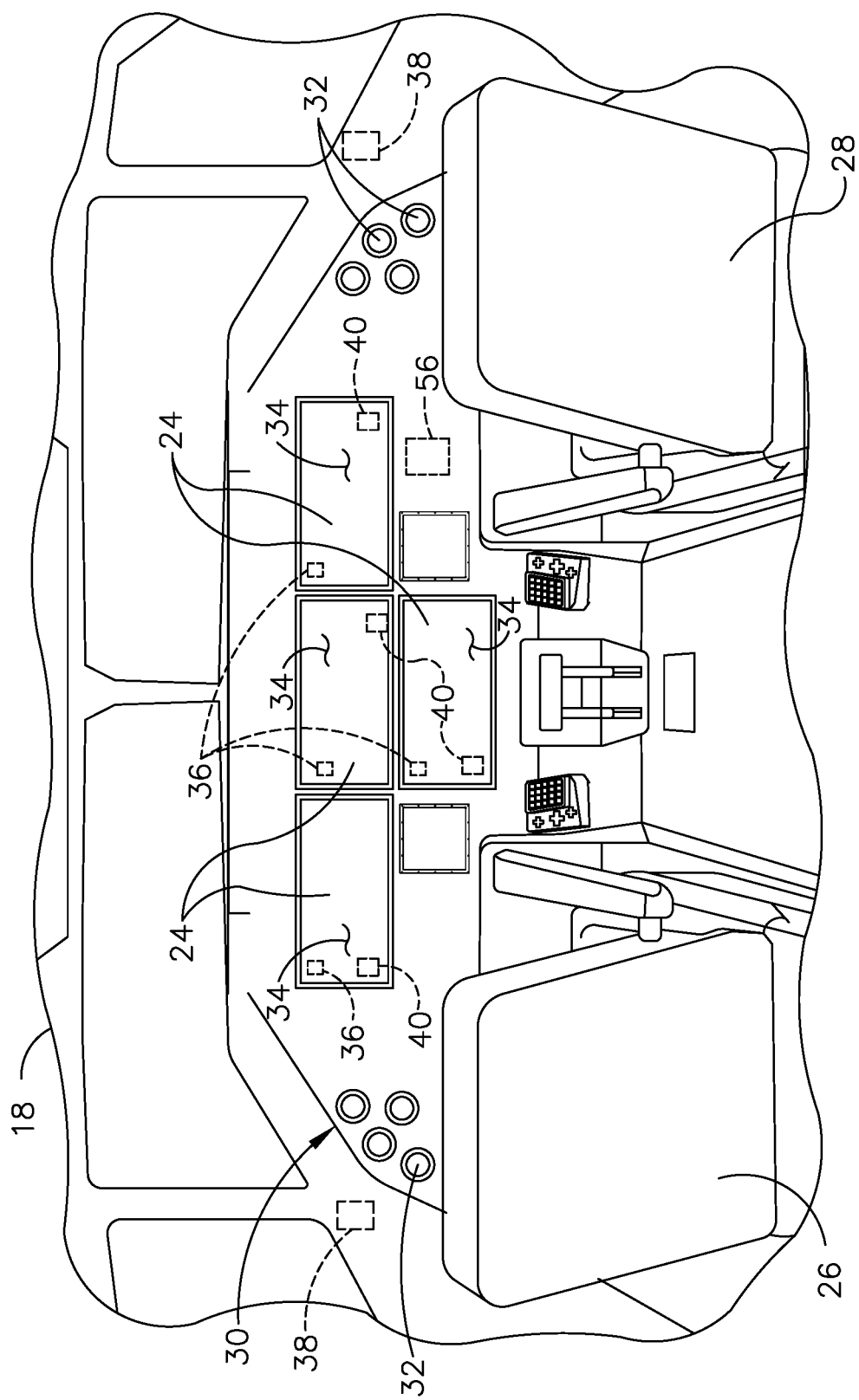
FIG. 2 is a perspective view of an exemplary portion of a cockpit of the aircraft of FIG. 1.

FIG. 2 illustrates a non-limiting example view of a portion of an aircraft cockpit 18. While a commercial aircraft has been illustrated, it is contemplated that aspects of the disclosure can be used in any type of legacy aircraft, for example, without limitation, fixed-wing, rotating-wing, rocket, personal aircraft, and military aircraft. A first user (e.g., a pilot) can be present in a seat 26 at the left side of the cockpit 18 and another user (e.g., a co-pilot) can be present at the right side of the cockpit 18 in a seat 28. A flight deck 30 can include various instruments 32, various displays, such as the display module assemblies 24. In one non-limiting aspect of the disclosure, the display module assembly 24 can include the display screen 34 that can be located in front of the pilot or co-pilot and can provide the flight crew with information to aid in flying the aircraft.

The set, or a subset, of the display module assemblies 24 or display screens 34 can include either primary flight displays or multifunction displays and can display a wide range of aircraft, flight, navigation, and other information used in the operation and control of the aircraft. Non-limiting aspects of the display module assemblies 24 or display screens 34 can include displaying color graphics or text to a user, pilot, or co-pilot. In another non-limiting aspect of the display module assembly 24, the display module assembly 24 can include a backlighting system (not shown), wherein a backlight is positioned behind the display screen 34, and generates or produces light, or otherwise illuminates the display screen 34.

At least a subset of the display module assemblies 24 can also include an integrated backlight controller module 40 and a respective display ambient light sensor 36, shown schematically in dotted outline. Aspect of the disclosure can be included wherein optional additional ambient light sensor 38 can be located, carried, integrated, or the like elsewhere in the aircraft 10, the flight deck 30, or a subcomponent thereof (i.e. but not located as a portion of a display module assembly 24). The display ambient light sensor 36 or the additional ambient light sensor 38 can be configured or adapted to detect, sense, measure, or the like ambient light information or data that the sensors 36, 38 is exposed to, and deliver that ambient light data to the backlight controller module 40. Non-limiting examples of ambient light information or data can include an intensity of light exposure of the ambient light sensors 36, 38. In another non-limiting example a remote controller module 56 can be included in the aircraft 10, remotely located from the set of display module assemblies 24.

In another non-limiting example of the disclosure, the ambient light sensors 36, 38 can further include data related to the physical position of sensor 36, 38, orientation of the sensor 36, 38, or a combination thereof. In another non-limiting example, the data related to the physical position of sensor 36, 38, orientation of the sensor 36, 38, can be referential data relative to a predetermined point of reference, such as an offset from a center point of the cockpit 18 or aircraft 10, or an offset from a horizon.

The set of display module assemblies 24 can be laid out in any manner, and need not be coplanar or the same size. For example, a subset of the display module assemblies 24 or display screens 34 can be oriented for viewing by a pilot or co-pilot, sitting relative to the seats 26, 28. In another non-limiting aspect of the disclosure, the set, or a subset, of the display module assemblies 24 or display screens 34 can include a touch screen display or touch screen interface and can be used by one or more flight crewmembers, including the pilot and co-pilot, to interact with the systems of the aircraft.

Figure 3:
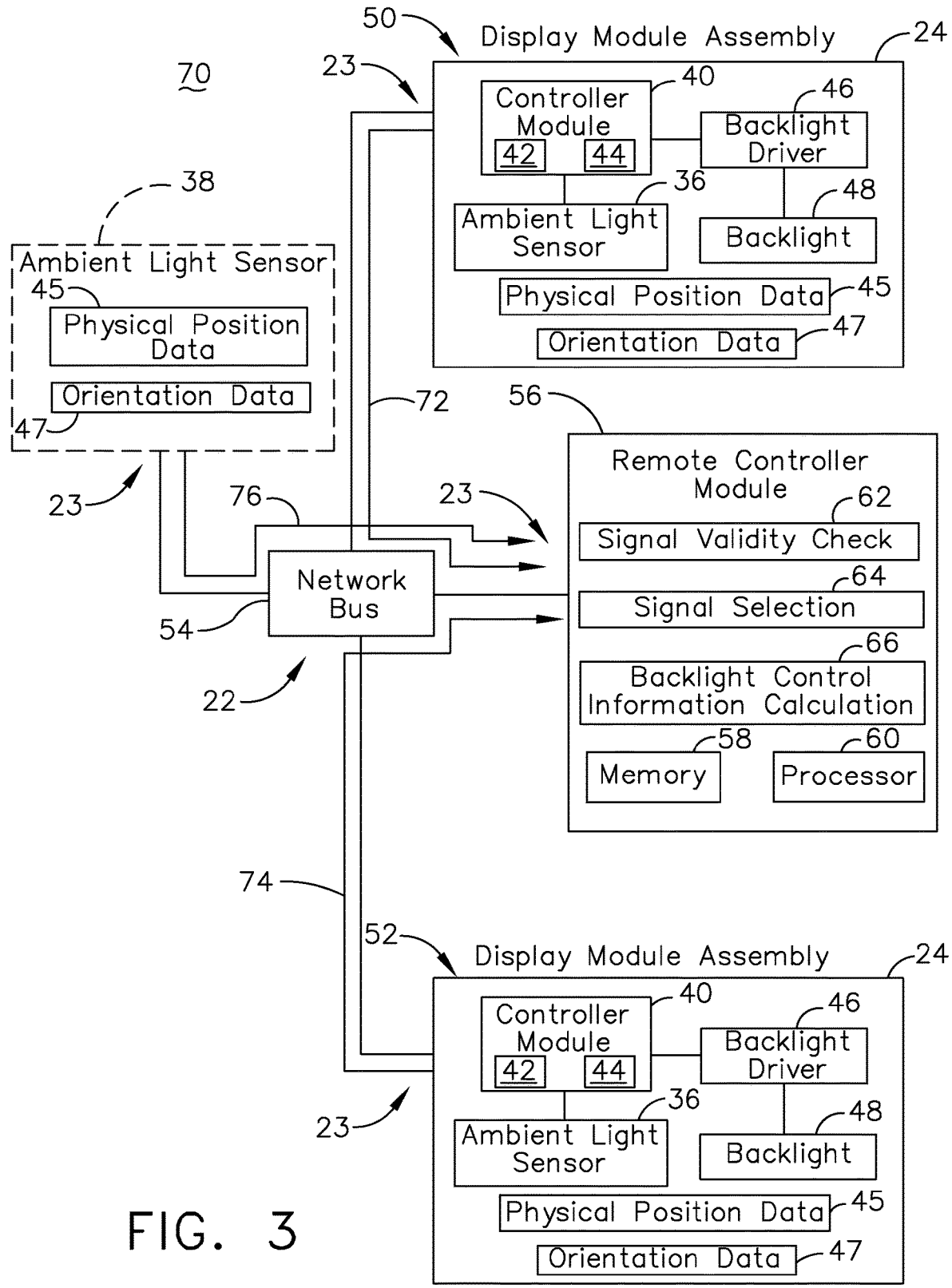
FIG. 3 is a schematic view a display control system for a set of display module assemblies of FIG. 2, in accordance with various aspects described herein.

FIG. 3 illustrates a schematic view of a display control system 70 for operating at least a subset of the display module assemblies 24, shown as a first display module assembly 50 and a second display module assembly 52. The first and second display module assemblies 50, 52 can be communicatively connected by the communications network 22 by way of a respective network interface 23 connected with a network bus 54. As used herein, a network interface 23 can include any communications interface configured or adapted to interact with the network 22 or network bus 54. The network bus 54 can be further communicatively connected with at least one other ambient light sensor 38, by way of a network interface 23, where remotely located from the set of display module assemblies 24, and the remote controller module 56, remotely located from the set of display module assemblies 24, 50, 52. Interacting with the network 22 or network bus 54 can include, but is not limited to, generating data packets, encapsulating data payloads, receiving data packets, routing or determining which routing information is utilized, or the like. Non-limiting examples of communication interfaces 23 can include Ethernet adapters, serial bus adapters, fiber optical adapters, or the like.

Each of the first and second display module assemblies 50, 52 can include the integrated backlight controller module 40 having memory 42 and a processor 44, the display ambient light sensor 36, a backlight driver 46, and a backlight 48, such as a backlighting light source or backlight illuminator. Non-limiting aspects of the first or second display module assemblies 50, 52 can further include at least one of physical position data 45 sensing, measuring, or storing data related to the physical position of display ambient light sensor 36, display module assembly 24, display screen 34, or the like, or orientation data 47 related to the orientation of the display ambient light sensor 36 display module assembly 24, display screen 34, or the like. While the physical position data 45 and orientation data 47 are shown separated from other components of the respective display module assemblies 24, 50, 52, additional or alternative aspects can be included wherein, for example, at least a subset of the data 45, 47 can be sensed or measured by a respectively adapted sensor (not shown), or predetermined and stored or saved in the memory 42 of the backlight controller module 40.

In another non-limiting aspect, the ambient light sensor 38 can further include at least one of physical position data 45 or orientation data 47 related to the orientation of the ambient light sensor 38. Again, at least a subset of the data 45, 47 can be sensed or measured by a respectively adapted sensor (not shown), or predetermined and stored or saved in a memory (not shown).

The remote controller module 56 can include memory 58 and a processor 60, and can include programmatic code to execute or otherwise operate a non-limiting set of optional modules having respective functionalities at the remote controller module 56. For instance, the remote controller module 56 or processor 60 can be configured or adapted to determine or execute a signal validity check module 62, wherein a signal provided to the remote controller module 56 is validated to ensure a correct operation, status, or the like, of the signal, or of another component supplying the signal. In another instance, the remote controller module 56 or processor 60 can be configured or adapted to perform or determine a signal selection module 64, wherein a signal is selected from a set of signals, as described herein. In yet another instance, the remote controller module 56 or processor 60 can be configured or adapted to perform or determine a backlight control information calculation module 66, wherein the remote controller module 56 or processor 60 determines a resultant backlight control instruction based on a set of parameters.

During operation of the display control system 70, a set of signals can be produced or generated by the communicatively connected components, such as the first display module assembly 50, the second display module assembly 52, and the ambient light sensor 38. The set of signals can be internal to the respective components (e.g. a signal generated and delivered entirely within a respective component, such as the first display module assembly 50), or internal and external to the respective components (e.g. a signal generated by an ambient light sensor 36 of the first display module assembly 50 and later at least partially communicated by way of the network 22).

For example, in an example operation of the display control system 70, the first display module assembly 50 can operate wherein the ambient light sensor 36 generates an internal output signal representative of sensed or measured ambient light data. The output signal can be provided to the backlight controller module 40 of the first display module assembly 50. The backlight controller module 40, in turn, can controllably operate the backlight driver 46 to control, enable, adjust, or otherwise illuminate the backlight 48 in accordance with the ambient light data. For example, if the ambient light sensor 36 senses or measures a high illumination intensity, the backlight 48 can in turn increase the illumination in accordance with a predetermined or dynamic operating parameter instruction (e.g. as determined by the backlight controller module 40), so a pilot, co-pilot, or viewer can more readily receive, review, or otherwise view information on the display screen (not shown in FIG. 3).

The internal output signal generated by the ambient light sensor 36 of the first display module assembly 50 can further be generated, published, or included as an external signal delivered, supplied, or provided from the first display module assembly 50 to the network 22, for instance by way of the network interface 23. The external signal can further be provided to or received by, for example, at least the remote controller module 56 by way of the network 22. The external signal can be representative of the operational status signal of the ambient light sensor 36 of the first display module assembly 50, and can be based at least partially on the output signal of the ambient light sensor 36. The external signal from the first display module assembly 50 (hereafter, the "first operational status signal") is illustrated as an arrow 72. In another non-limiting aspect of the disclosure, the first operational status signal 72 can further include additional aspects or data beyond the output signal of the ambient light sensor 36, such as the physical position data 45 of the first display module assembly 50, the orientation data 47 of the first display module assembly 50, or a combination thereof.

Non-limiting aspects of the display control system 70 can be included wherein the second display module assembly 52 operates in a substantially similar operation as the first display module assembly 52, as described herein. As shown, the internal output signal generated by the ambient light sensor 36 of the second display module assembly 52 can further be generated, published, or included as an external signal delivered, supplied, or provided from the second display module assembly 52 to the network 22. The external signal can further be provided to or received by, for example, at least the remote controller module 56, and can be representative of the operational status signal of the ambient light sensor 36 of the second display module assembly 52, and can be based at least partially on the output signal of the ambient light sensor 36. The external signal from the second display module assembly 52 (hereafter, the "second operational status signal") is also illustrated as an arrow 74.

In a further non-limiting aspect of the display control system 70, the ambient light sensor 38 can also generates an output signal representative of sensed or measured ambient light data. The internal output signal generated by the ambient light sensor 38 can further be generated, published, or included as an external signal delivered, supplied, or provided from the ambient light sensor 38 to the network 22, for instance by way of the network interface 23. The external signal can further be provided to or received by, for example, at least the remote controller module 56 by way of the network 22. The external signal (hereafter, the "third operational status signal") is illustrated as an arrow 76 and can be representative of the operational status signal of the ambient light sensor 38. In another non-limiting aspect of the disclosure, the third operational status signal 76 can further include additional aspects or data beyond the output signal of the ambient light sensor 38, such as the physical position data 45 of the ambient light sensor 38, the orientation data 47 of the ambient light sensor 38, or a combination thereof.

While aspects of the disclosure are illustrated wherein the first display module assembly 50, the second display module assembly 52, or the ambient light sensor 38 provide the respective first, second, and third operational status signals 72, 74, 76 to the remote controller module 56, aspects of the disclosure can be included wherein at least one of the assemblies 50, 52 or sensor 38 broadcast the respective operational status signal 72, 74, 76 to all components on the network 22. In non-limiting instances, the sensing or measuring by the ambient light sensor 36, 38, the output signal generation, or the operational status signal generation 72, 74, 76 can be periodic or continuous. Additionally, while the physical position data 45 and orientation data 47 is illustrated as located relative to the respective components 38, 50, 52, non-limiting aspects of the disclosure can be included wherein at least one of physical position data 45, orientation data 47, or a combination thereof, for each respective component 38, 50, 52, is stored in memory 58 of the remote controller module 56. For instance, the memory 58 of the remote controller module 56 can have predetermined or predefined physical position data 45 or orientation data 47 for each known or expected communicative component connected with the network 22.

In a first example operation, the remote controller module 56 can be adapted or configured to receive the set of operational status signals 72, 74, 76 from the communicatively connected networked components 50, 52, 38, and perform a signal validity check utilizing the signal validity check module 62. The signal validity check module 62 can include validating the sensed or measured ambient light data of the respective operational status signal 72, 74, 76, and determine if any data is erroneous. Examples of erroneous data can include, but is not limited to, data that is out of expected operational range, missing data, or the like that can indicate the respective ambient light sensor 36, 38 is not operating correctly or as expected. An ambient light sensor 36, 38 not operating correctly or as expected can indicate the respective ambient light sensor 36, 38 has failed, or is otherwise not operational for the intended purposes. Determining if any data is erroneous can include comparing, analyzing, or processing data of the respective operational status signal 72, 74, 76, as needed to validate the operational status of the respective ambient light sensor 36, 38. Thus, the signal validity check module 62 can generate an output indicative of whether the respective operational status signal 72, 74, 76 is indicative of an ambient light sensor 36, 38 is operational or has failed.

Figure 4:
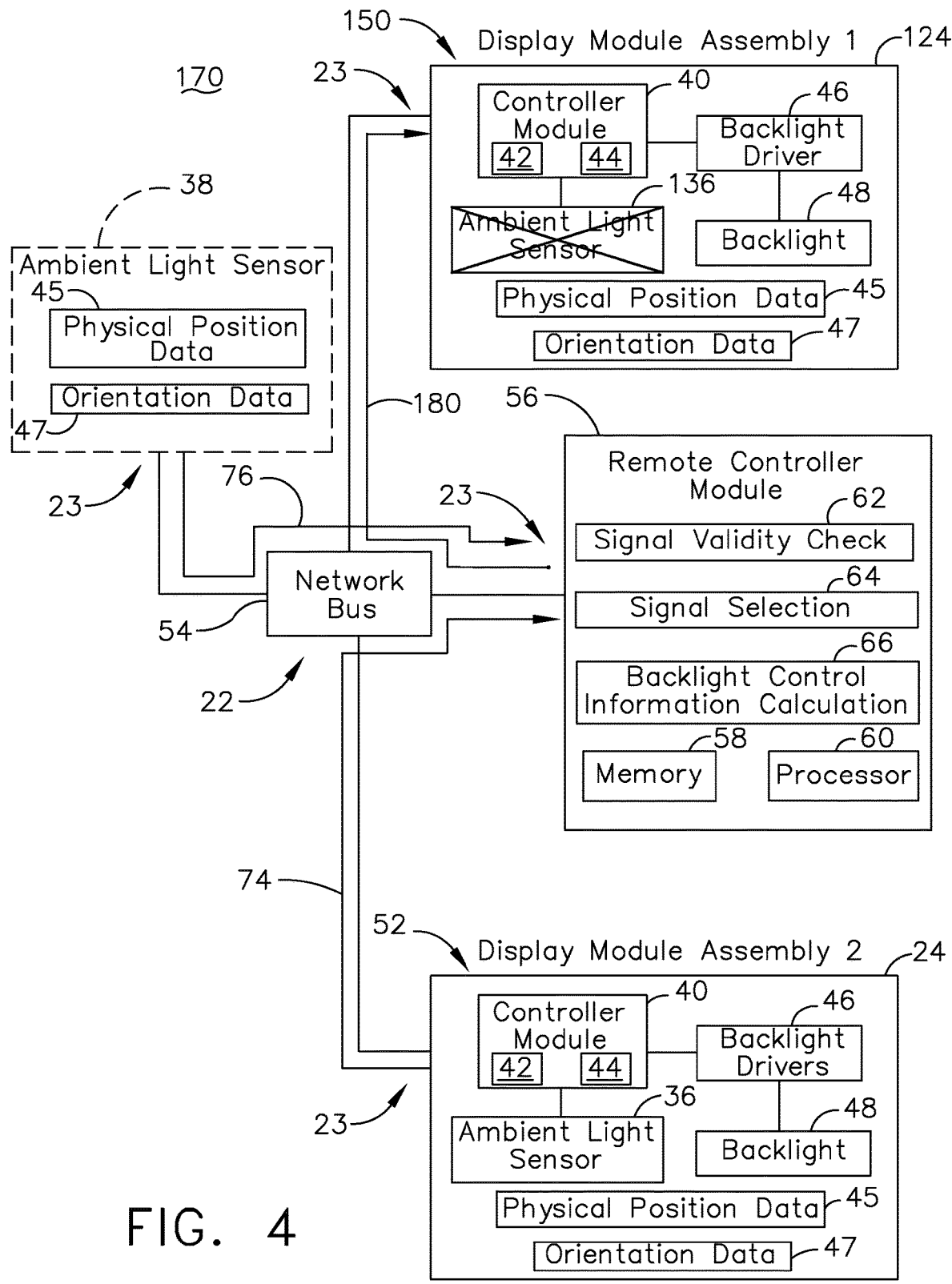
FIG. 4 is a schematic view of the display control system of FIG. 3, wherein a display module assembly includes an ambient light sensor failure, in accordance with various aspects described herein.

Turning now to FIG. 4, an example display control system 170 is illustrated wherein an ambient light sensor 136 of one of the set of display module assemblies 124, shown as the first display module assembly 150, has failed. For instance, the signal validity check module 62 has determined the ambient light sensor 136 of the first display module assembly 150 has sent or has been sending erroneous data. Upon a determination by the signal validity check module 62 that the operational status signal 72, 74, 76 indicates the ambient light sensor has failed, the remote controller module 56 can select, generate, or otherwise provide a replacement ambient light operational status signal 180 (indicated by arrow), including replacement ambient light data, if needed. For example, while one of the first or second display module assemblies 50, 52 are described to operably illuminate a backlight 48 in accordance with ambient light data, the ambient light sensor 38, apart from a display module assembly, does not need a replacement ambient light operational status signal 180, including replacement ambient light data, to further operate.

In selecting, generating, or otherwise providing a replacement ambient light operational status signal 180, the remote controller module 56 can utilize the signal selection module 64, wherein the remote controller module 56 can determine, select, or generating the replacement ambient light operational status signal 180, including replacement ambient light data, to provide to the display module assembly 150 having the failed ambient light sensor 136. For instance, in a first example, the signal selection module 64 can select one of the second operational status signal 74 or the third operational status signal 76, assuming those operational status signals 74, 76 have been validated by the signal validity check module 62.

The signal selection module 64 can select, for example, the third operational status signal 76 including replacement ambient light data sensed or measured by the ambient light sensor 38, and supply, generate, or otherwise provide the third operational status signal 76 as the replacement operational status signal 180 to the first display module assembly 150. In turn, the first display module assembly 150 or the backlight controller module 40 thereof can utilize the replacement ambient light data from the replacement operational status signal 180 to controllably operate the backlight driver 46 to control, enable, adjust, or otherwise illuminate the backlight 48 in accordance with the replacement ambient light data. In this sense, the backlight 48 is controllably illuminated based on the sensed or measured data of the remote ambient light sensor 38.

In a second example, the signal selection module 64 can select one of the second operational status signal 74 or the third operational status signal 76, again, assuming those operational status signals 74, 76 have been validated by the signal validity check module 62, based on at least one of the physical position data 45 of the first display module assembly 150, the orientation data 47 of the first display module assembly 150, or a combination thereof. In this example, the signal selection module 64 can further include, or be based upon aspects of the backlight control information calculation module 66, which can include supplying, generating, or otherwise providing a replacement operational status signal 180 based on additional parameters, considerations, or the like.

For instance, the backlight control information calculation module 66 can include comparing the physical position data 45 of the first display module assembly 150 with the physical position data 45 of the other ambient light sensors 36, 38. In the comparison, the ambient light sensor 36, 38 most physically proximate to the failed ambient light sensor 136 can be identified to the signal selection module 64, and the replacement operational status signal 180 can be based on the operational status signal 74, 76 corresponding to the most physically proximate ambient light sensor 36, 38 or ambient light sensor data. This can be based on an association that the most physically proximate operating ambient light sensor 36, 38 is generating useful data for illuminating the backlight 48 of the first display module assembly 150.

In another instance, the backlight control information calculation module 66 can include comparing or contrasting the orientation data 47 of the first display module assembly 150 with the orientation data 47 of the other ambient light sensors 36, 38. In the comparison, the ambient light sensor 36, 38 most similarly orientated to the failed ambient light sensor 136 can be identified to the signal selection module 64, and the replacement operational status signal 180 can be based on the operational status signal 74, 76 corresponding to the most similarly orientated ambient light sensor 36, 38 or ambient light sensor data. This can be based on an association that the most similarly orientated operating ambient light sensor 36, 38 is generating useful data for illuminating the backlight 48 of the first display module assembly 150.

In yet another instance, the backlight control information calculation module 66 can include both the physical position data 45 and the orientation data 47 of the first display module assembly 150 can be compared or contrasted with the physical position data 45 and the orientation data 47 of the other ambient light sensors 36, 38. This can be based on an association that a combination of physical position data 45 and orientation data 47 can identify the most useful data for illuminating the backlight 48 of the first display module assembly 150.

In even yet another instance, the backlight control information calculation module 66 can include determining, calculating, generating, or supplying entirely new data based on at least one of the physical position data 45 and the orientation data 47 of the first display module assembly 150, compared or contrasted with the physical position data 45 and the orientation data 47 of the other ambient light sensors 36, 38. For example, the backlight control information calculation module 66 can include combining aspects of the second and third operational status signals 74, 76, wherein, for example, the second operational status signal 74 corresponds to the most physically proximate ambient light sensor 36, and wherein the third operation status signal 76 corresponding to the most similarly orientated ambient light sensor 38, relative to the failed ambient light sensor 36. This can be based on an association that a combination of physical position data 45 and orientation data 47 can identify the most useful data for illuminating the backlight 48 of the first display module assembly 150.

Regardless of the operation, generation, or identification of the most useful data for illuminating the backlight 48 of the first display module assembly 150 by the backlight control information calculation module 66, the signal selection module 64 can select, supply, generate, or otherwise provide the respective operational status signal 74, 76 as the replacement operational status signal 180 to the first display module assembly 150.

While aspects of the signal validity check module 62, the signal selection module 64, and backlight control information calculation module 66 are described and illustrated as occurring within or by way of the remote controller module 56, aspects of the disclosure can be included wherein the respective modules 62, 64, 66 can occur in, or by way of, the display controller module 40 of one of the set of display module assemblies 24, 50, 52, 124, 150. In this instance, non-limiting aspects of the disclosure can be included wherein the network 22 is regularly, periodically, or continuously publishing or broadcasting at least a subset of operational status signals 72, 74, 76 (for example, originating from each respective communicatively connected component 38, 50, 52, or from the remote controller module 56).

For example, the display controller module 40 of the first display module assembly 150 can operate of effect the signal validity check module 62 locally (i.e. within or at the first display module assembly 150, as opposed to remotely at the remote controller module 56) to determine whether the ambient light sensor 136 has failed. Upon determining the ambient light sensor 136 has failed, the first display module assembly 150 can receive the published or broadcasted subset of operational status signals 74, 76 from other networked components 38, 52, and determine or utilize a replacement operational status signal 180 based on the received subset of operational status signals 74, 76, in accordance with the signal selection module 64 or backlight control information calculation module 66, as described herein. In yet another non-limiting aspect of the disclosure, the backlight control information calculation module 66 can include directly generating a backlight driver control signal, that is, a replacement operational status signal 180 can be delivered directly to the backlight driver 46 of the display module assembly 150 having the failed ambient light sensor 36. In this example, the backlight driver control signal can directly operate or drive the illumination of the backlight 48 without further instruction, modification, or the like, of the replacement operational status signal 180.

Figure 5:
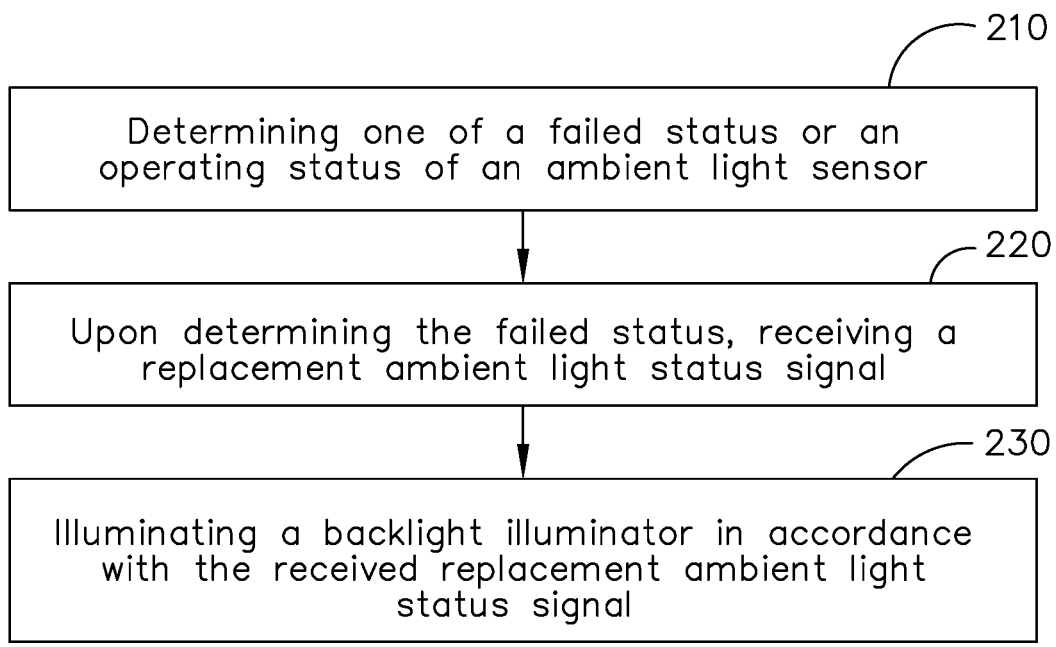
FIG. 5 is an example flow chart diagram of demonstrating a method of operating a display module assembly that can be used in the aircraft of FIG. 1, in accordance with various aspects described herein.

FIG. 5 illustrates a flow chart demonstrating a method 200 of operating a display module such as those used in the aircraft 10. The method 200 can include, but is not limited to, determining, in a controller module, such as the backlight controller module 40 of the remote controller module 56, one of a failed status or an operating status of an ambient light sensor 36, 38, 136 of the display module assembly 24, 50, 52, 124, 150, at 210. Upon determining the failed status, the method 200 can include receiving a replacement ambient light operational status signal 180 at a network interface 23 operably coupled to the backlight controller module 40 of the display module assembly 152 having the failed ambient light sensor 136, at 220. As explained, the replacement ambient light operational status signal 180 can be selected, provided, generated, or the like, by the remote controller module 56, or by the display controller module 40. The method 200 continues by illuminating, via the backlight controller module 40, the backlight 48 of the display module assembly 152 in accordance with the received replacement ambient light operational status signal 180, at 230.

Non-limiting aspects of the method 200 can further include upon determining the operating status, publishing, by the backlight controller module 40, the operating status of the ambient light sensor 36 to the network 22 by way of the network interface 23 and illuminating the backlight 48 in accordance with ambient light data generated by the ambient light sensor 36. In another non-limiting aspect, the method 200 can further include accumulating, in the remote controller module 56 remote from the display module assembly 50 and communicatively coupled with the network interface 23, a set of operational statuses from a set of ambient light sensors 36, 38, and publishing, by the remote controller module 56 at least one replacement ambient light operational status signal 72, 74, 76 to the network interface 23. In this example, the accumulating the set of operational statuses from the set of ambient light sensors 36, 38 can include at least a subset of operational statuses from a set of ambient light sensors 36 of other display modules assemblies 52 and at least a subset of operational statuses from a set of ambient light sensors 38 without, or unattached to display modules assemblies 24.

In yet another non-limiting aspect, the method 200 can include wherein publishing the at least one replacement ambient light operational status signal 72, 74, 76 includes at least a portion of at least one of the accumulated set of operational statuses from a set of ambient light sensors 36, 38. In yet another non-limiting aspect, the method 200 can be included wherein the accumulating the set of operational statuses includes accumulating at least one of physical location data 45 or orientation data 47 related to each of the set of ambient light sensors 36, 38. In yet another non-limiting aspect, the method 200 can be included wherein publishing the at least one replacement ambient light operational status signal 72, 74, 76 can include at least one of comparing a physical location of the display module assembly 150 having the failed ambient light sensor 136 with a physical location of another ambient light sensor 36, 38, or comparing the orientation of the display module assembly 150 having the failed ambient light sensor 136 with an orientation of another ambient light sensor 36, 38.

In even yet another non-limiting aspect, the method 200 can include wherein publishing the at least one replacement ambient light operational status signal 72, 74, 76 further includes at least one of selecting for publishing, by at least one of the signal selection module 64 or the backlight control information calculation module 66, the operational status of the most physically proximate another ambient light sensor 36, 38, relative to the display module assembly 150 having the failed ambient light sensor 136, or selecting for publishing the operational status of the most similarly orientated another ambient light sensor 36, 38, relative to the display module assembly 150 having the failed ambient light sensor 136. In even yet another non-limiting aspect, the method 200 can be included wherein publishing the at least one replacement ambient light operational status signal 72, 74, 76 includes combining, by the backlight control information calculation module 66, at least a subset of the accumulated set of operational statuses.

In even yet another non-limiting aspect, the method 200 can further include selecting, in the controller module 40, 56 the replacement ambient light status signal 72, 74, 76 from a published set of replacement ambient light operational status signals 72, 74, 76.

The sequence depicted is for illustrative purposes only and is not meant to limit the method 200 in any way. It is understood that the portions of the method 200 can proceed in a different logical order, additional or intervening portions can be included, or described portions of the method 200 can be divided into multiple portions, or described portions of the method can be omitted without detracting from the described method.

Many other possible aspects and configurations in addition to that shown in the above figures are contemplated by the present disclosure. Additionally, the design and placement of the various components can be rearranged such that a number of different configurations could be realized.

The aspects disclosed herein provide a method and apparatus for operating a display module assembly. The technical effect is that the above described aspects enable the operation of a display module assembly having a failed ambient light sensor by way of enabling, allowing, generating, or otherwise providing a replacement operational status signal having replacement ambient light data for the display module assembly. One advantage that can be realized in the above aspects is that the above described aspects solve the issue of having a dedicated backup, replacement, or redundant backlight controller or ambient light sensor at each display module assembly. Display module assemblies in the cockpit can be utilized for control, interaction, or for displaying information for control of an aircraft.

With a failed backlight system or failed ambient light sensor, the display module assembly, display screen, or the like can be difficult to view due to dim backlight illumination or bright backlight illumination. Conventional display module assemblies requiring multiple ambient light sensors and multiple on-board display backlight controllers for redundancy purposes. By using a remote processing resource or controller module aboard the aircraft, such as described herein, redundancies of ambient light sensors located on each respective display module assembly can be eliminated and centralized. Reducing or eliminating components reduces component counts and costs, while providing equivalent or improved reliability.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a display module, the method comprising:
   determining, in a backlight controller module, one of a failed status or an operating status of an ambient light sensor of the display module;
   upon determining the failed status;
   receiving a replacement ambient light operational status signal including data sensed by the ambient light sensor and at least one of physical location data of the ambient light sensor and orientation data of the ambient light sensor, at a network interface operably coupled to the backlight controller module;
   publishing, by the backlight controller module, the replacement ambient light operational status signal to the network interface, wherein the publishing includes at least one of comparing a physical location of the display module having the failed ambient light sensor with a physical location of another ambient light sensor, or comparing the orientation of the display module having the failed ambient light sensor with an orientation of another ambient light sensor; and
   illuminating, via the backlight controller module, a backlight illuminator of the display module in accordance with the received replacement ambient light operational status signal; and
   upon determining the operating status, publishing, by the backlight controller module, the operating status of the ambient light sensor to a network by way of the network interface and illuminating the backlight illuminator in accordance with ambient light data generated by the ambient light sensor.

2. The method of claim 1, further comprising accumulating, in a controller module remote from the display module and communicatively coupled with the network interface, a set of operational statuses from a set of ambient light sensors, and publishing, by the controller module, at least one replacement ambient light operational status signal to the network interface.

3. The method of claim 2 wherein the accumulating the set of operational statuses from the set of ambient light sensors includes at least a subset of operational statuses from a set of ambient light sensors of other display modules and at least a subset of operational statuses from a set of ambient light sensors without display modules.

4. The method of claim 2 wherein publishing the at least one replacement ambient light operational status signal includes at least a portion of at least one of the accumulated set of operational statuses.

5. The method of claim 4 wherein the accumulating the set of operational statuses includes accumulating at least one of physical location data or orientation data related to each of the set of ambient light sensors.

6. The method of claim 4 wherein publishing the replacement ambient light operational status signal includes combining at least a subset of the accumulated set of operational statuses.

7. The method of claim 2, further comprising
selecting, in the backlight controller module the replacement ambient light status signal from the published set of replacement ambient light operational status signals.

8. The method of claim 1 wherein publishing the replacement ambient light operational status signal further comprises at least one of selecting for publishing the operational status of the most physically proximate another ambient light sensor, relative to the display module having the failed ambient light sensor, or selecting for publishing the operational status of the most similarly orientated another ambient light sensor, relative to the display module having the failed ambient light sensor.

9. The method of claim 1, further comprising at least one of selecting the replacement ambient light operational status signal corresponding to the most physically proximate ambient light sensor, relative to the display module having the failed ambient light sensor, or selecting the replacement ambient light operational status signal corresponding to the most similarly orientated ambient light sensor, relative to the display module having the failed ambient light sensor.

* * * * *